United States Patent [19]
McLain

[11] 3,877,622
[45] Apr. 15, 1975

[54] FOLDABLE BICYCLE RACK

[75] Inventor: Perry E. McLain, Sacramento, Calif.

[73] Assignees: Daniel E. McDonald; Terrance I. Espeland

[22] Filed: Sept. 27, 1972

[21] Appl. No.: 292,745

[52] U.S. Cl............... 224/42.03 B; 211/17; 211/22
[51] Int. Cl............................................. B60r 9/10
[58] Field of Search....... 224/42.03 B, 42.06, 42.07, 224/42.08, 42.25, 42.03 R, 42.1 E; 211/17, 18, 22; 214/454

[56] References Cited
UNITED STATES PATENTS

| | | | |
|---|---|---|---|
| 640,736 | 1/1900 | Biester | 211/18 |
| 1,352,559 | 9/1920 | Teel | 224/42.25 |
| 2,746,659 | 5/1956 | Caruolo | 224/42.07 |
| 2,762,542 | 9/1956 | Hodgeman | 224/42.03 R |
| 2,812,087 | 11/1957 | Zeller | 224/42.1 E |
| 3,283,973 | 11/1966 | Wargo | 214/454 |
| 3,448,904 | 6/1969 | Sahr | 214/454 |
| 3,670,935 | 6/1972 | Hinkston | 224/42.03 B |

FOREIGN PATENTS OR APPLICATIONS

| | | | |
|---|---|---|---|
| 93,810 | 12/1938 | Sweden | 224/42.03 B |

Primary Examiner—Albert J. Makay
Assistant Examiner—Kenneth Noland
Attorney, Agent, or Firm—Flehr, Hohbach, Test, Albritton & Herbert

[57] ABSTRACT

A foldable bicycle rack for mounting on the bumper of a car adjustable to fit any bumper, front or rear. The rack members are light weight steel channel or angle and are pivotally joined in four locations to form a trapezoidal structure when in the unfolded carrying configuration. The rack base forms the long parallel side and locking pins are provided to prevent pivoting of the non-parallel upright members about the base pivot points when in the unfolded configuration. Foldinng in place on the bumper is accomplished by removing the locking pins and pivoting the non-parallel upright members toward each other about the base pivot points thereby causing the top plate member to pivot about the top pivot points, inverting its position, and collapsing the trapezoid to lie substantially alongside the bumper in a folded configuration. Bicycle hangers are carried by the top plate member which is an open "C" channel member and are folded within the channel prior to collapsing the rack from its unfolded trapezoidal condition.

12 Claims, 6 Drawing Figures

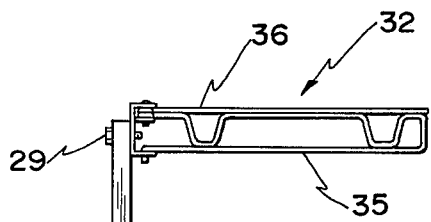
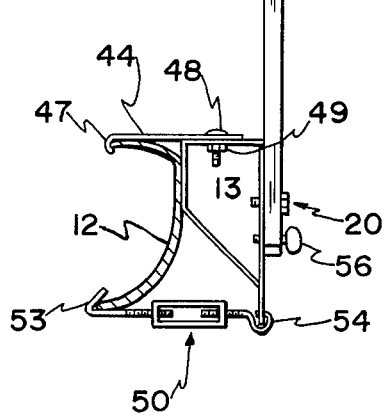
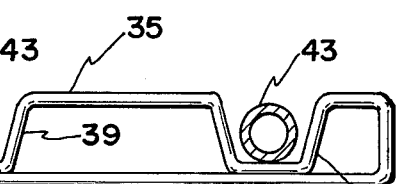
FIG.-3
FIG.-4
FIG.-5
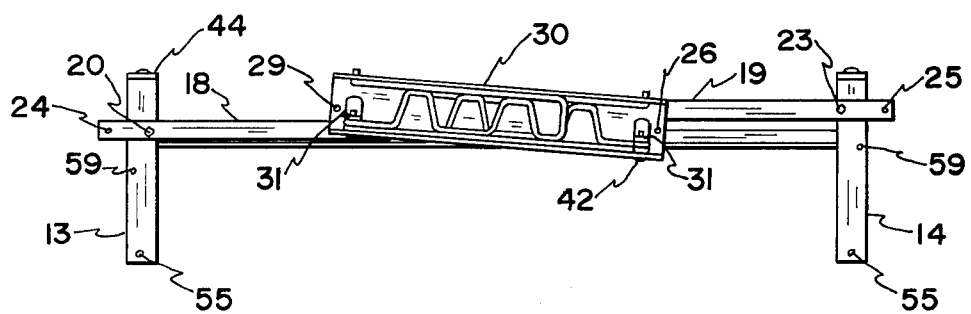
FIG.-6

FOLDABLE BICYCLE RACK

BACKGROUND OF THE INVENTION

This invention relates to a bicycle carrying rack which may be attached to a vehicle having a protective bumper. More particularly it relates to such a bicycle rack which when installed on the vehicle bumper may be conveniently collapsed or folded to assume a stored out-of-the-way position without requiring complete removal from the bumper.

Bicycle racks for attachment to vehicle bumpers are well known. They usually comprise a framework which is assembled away from the vehicle and subsequently attached to the vehicle through some adjustable means generally involving nuts, bolts, and washers and requiring the use of tools for implementing the attachment. This raises the necessity of carrying the proper tools in the vehicle for assembly to and removal from the bumper. Straps are generally required which lead forward from the top member of the rack to engage something on the vehicle framework, such as the forward edge of the trunk cover, to provide top support for the rack. This generally limits the use of the rack to the rear bumper of the vehicle. There is therefore seen to be a need for a bicycle rack which may be attached to the vheicle bumper and allowed to remain there, even during periods of non use, thereby saving the effort involved in installation and removal each time the rack is used.

SUMMARY AND OBJECTS OF THE INVENTION

In general the foldable bicycle rack consists of a base assembly which is attached through the use of adjustable means to a protective bumper on a vehicle. Upright support members are pivoted at the base assembly on one end and are constructed of light weight strong material. A top plate member is pivotally attached to the other end of the upright support members and is of a length shorter than that of the base thereby generally displaying a trapezoidal shape when unfolded in the carrying configuration. To maintain the rack in the unfolded configuration locking means are provided which pass through holes in the lower ends of the upright support members and the base assembly which become aligned when the rack is unfolded. A bicycle hanger is attached to the top plate member in a manner allowing it to be folded flush against the member in the storage configuration and to be pivoted to a position extending 90° relative to the top plate member in the carrying configuration. The rack is folded when not in use by removing the locking pins, pivoting the bicycle hangers to assume the flush position, pivoting the upright support members toward each other about their pivot points on the base, thereby allowing pivoting about the points where the support members are attached to the top plate member. This latter pivoting causes inversion of the top plate member when the rack has fully collapsed to its folded storage configuration.

In general it is an object of the present invention to provide a foldable bicycle rack which may be mounted on a vehicle bumper to remain there even during periods of non use.

Another object of the invention is to provide a foldable bicycle rack of the above character which folds into a compact stored position for periods of non-use.

Another object of the invention is to provide a foldable bicycle rack of the above character which may be mounted on either front or rear vehicle bumpers.

Another object of the present invention is to provide a foldable bicycle rack of the above character which is light in weight and structurally strong.

Another object of the present invention is to provide a foldable bicycle rack of the above character which will fit the bumpers attached to any vehicle.

Another object of the present invention is to provide a foldable bicycle rack of the above character which is firmly locked in the unfolded carrying configuration when in use.

Another object of the present invention is to provide a foldable bicycle rack of the above character with unique folding characteristics providing a small residual volume when in a folded configuration.

Another object of the present invention is to provide a foldable bicycle rack of the above character with a bicycle hanger and bicycle retainer that may be locked together locking the bicycle to the bicycle rack.

Another object of the present invention is to provide a foldable bicycle rack of the above character with bicycle hangers and bicycle retainers that fold out of harms way when in the folded configuration.

Additional objects and features of the invention will appear from the following description in which the preferred embodiment has been set forth in detail in conjunction with the accompanying drawings.

BRIEF DESCRIPTION OF THE DRAWINGS

FIG. 3 shows a side elevational view of the foldable bicycle rack in the unfolded configuration attached to a vehicle bumper.

FIG. 4 is a detailed side elevational view of the lower support of the bicycle hanger with bicycle framework bars shown in section carried thereon.

FIG. 5 is a detailed plan view of the bicycle retainer member of the bicycle hanger.

FIG. 6 is a front elevational view of the foldable bicycle rack in the folded storage configuration.

DESCRIPTION OF THE PREFERRED EMBODIMENT

Figure 1:
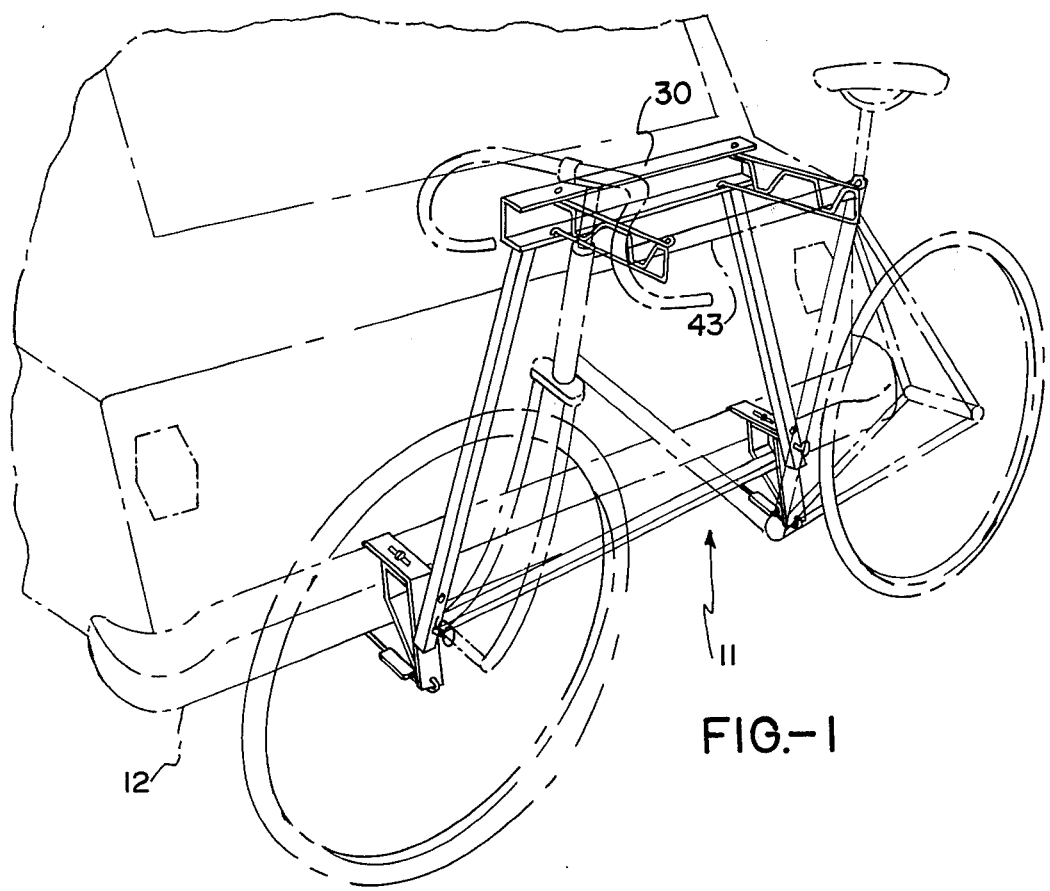
FIG. 1 shows an isometric view of the foldable bicycle rack installed on the rear bumper of a passenger vehicle and showing a bicycle carried thereon in ghost line.
Figure 2:
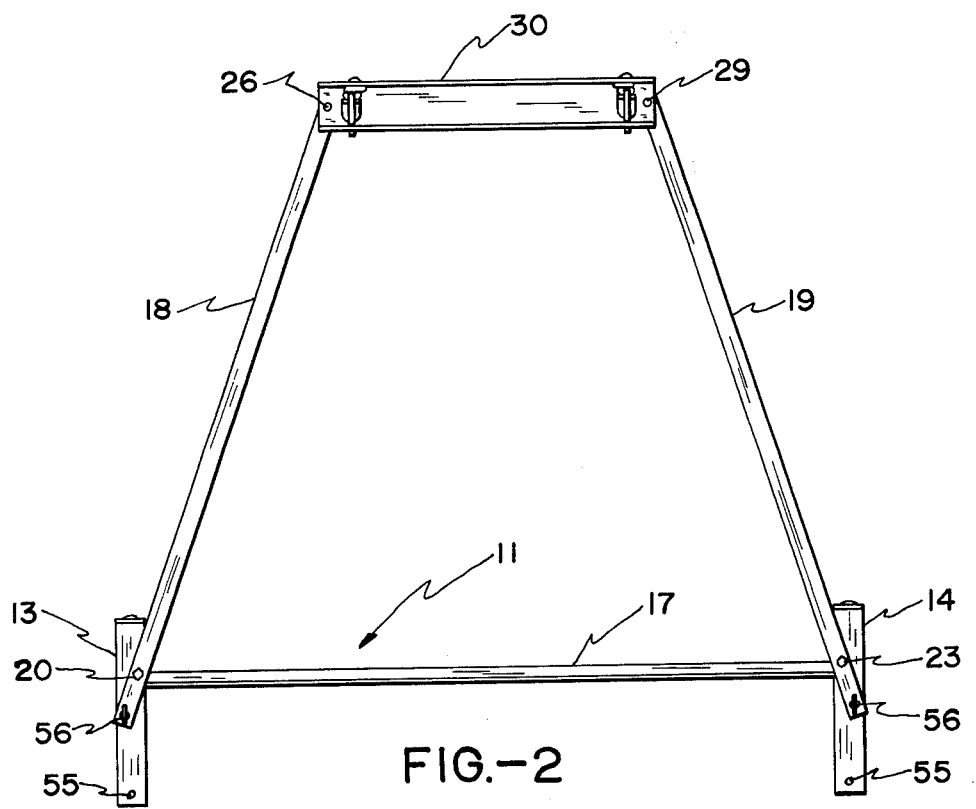
FIG. 2 shows a front elevational view of the foldable bicycle rack assembly in the unfolded carrying configuration.

The foldable bicycle rack has a base assembly 11 which extends in a direction generally parallel to a vehicle bumper 12 upon which it is installed. The base assembly 11 has left and right bumper brackets 13 and 14 which are spaced apart by and attached to the ends of a base member 17 which is formed of steel angle in this embodiment.

Left and right upright support members 18 and 19 are attached by pivot members 20 and 23 on bumper brackets 13 and 14. Pivot members 20 and 23 may be formed of a bolt passing through a nut swaged into the left and right bumper brackets 13 and 14 after passing through holes in upright supports 18 and 19. Upright support members 18 and 19 may be of some structurally strong and light material such as square cross section steel tubing. The right base pivot 23 is placed slightly closer to the upper edge of its respective bumper bracket 14 than is the left base pivot 20 as is most clearly shown in FIG. 6.

Upper left and right pivot members 26 and 29 join upright members 18 and 19 to a top plate member 30. The upper right pivot 29 may be formed of a bolt passing through the upper end of right upright support 19 and the right end of top plate member 30 and is secured in place by a swaged nut similar to that used at left and right base pivots 20 and 23. The upper left pivot point 26 is also formed of a bolt (not shown) passing through a nut swaged into the top plate 30 but the head of the bolt is countersunk to provide for clearance between the rearside of top plate member 30 and the front side of base member 17 in the folded configuration.

Top plate member 30 is formed of a C-shaped open channel section shorter than the length of base member 17. Two sections of the base portion of top plate 30 are punched out near the ends to form flaps 31 extending perpendicular to the base of the top plate 30. In-line holes (not shown) are drilled through the two arms of top plate 30 and the flaps 31. A bicycle hanger 32 has a lower support member 35 and an upper retainer member 36. The lower support member 35 has a loop 37 formed at one end and a short right angle bend 38 disposed below the loop 37 on the same end. The upper retainer 36 has a loop 41 formed at each end. The right angle bend 38 on each of the two lower support members 35 is disposed in the holes in the lower arm of the C channel top plate 30, and the loop 37 is placed between the upper arm of the C channel and the flap 31 in line with the holes therethrough. One of the loops 41 on upper retainer member 36 is also placed in line with the holes between the upper arm of the C channel and flap 31. A pin 42 is placed through the holes and the loops 37 and 41 and flattened or bent on the lower end to secure it in place. Both lower support member 35 and upper retainer 36 have a non abrasive soft plastic coating applied prior to assembly. Lower support member 35 has two U-shaped depressions 39 adapted to surround a bar 43 in the framework of a bicycle.

Left and right bumper brackets 13 and 14 have flat upper surfaces having a hole therethrough. A bracket adjust member 44 is formed of a rectangular piece having an elongate hole with the major dimension in the direction of the longest dimension of the adjust member 44. One end of the bracket adjust member 44 is bent downward through 180° to form a hook 47. The hook 47 is adapted to engage the inside upper edge of the bumper 12. With bracket adjust member 44 in such a position the elongate hole overlies the hole in the flat upper surfaces of left and right bumper bracket members 13 and 14. A bolt 48 is extended therethrough and bracket adjust member 44 is fixed in a predetermined position by tightening nut 49.

Turnbuckle 50 has one threaded member with a V-shaped hook 53 on the end. The other threaded member has a C-shaped hook 54 on the end. Two short sections of light chain (not shown) are provided which may be bolted to bumper brackets 13 and 14 by passing a bolt through a link and engaging a threaded hole 55 in the lower extension of bumper brackets 13 and 14. The V-shaped hook 53 is adapted to engage the lower inner edge of the bumper 12 and the C-shaped hook 54 is passed through one of the links of the chain. In the event the turnbuckle is sufficiently long to provide adjustment without using the short sections of chain the C-shaped hook 54 is inserted in the hole 55 in the lower extension of left and right bumper brackets 13 and 14. Locking means are provided in the form of pins 56 which pass through holes 24 and 25 in the bottom of both upright support members 18 and 19 respectively and into a threaded hole 59 located in the bumper brackets 13 and 14.

Turning now to the manner in which the foldable bicycle rack is installed and operated reference is made to FIG. 1. An unfolded bicycle rack is shown installed on the rear bumper of a passenger vehicle carrying a bicycle. Installation is made by first assembling the base assembly 11 with left and right upright support members 18 and 19, the top plate 30 and a pair of bicycle hangers 32. Bracket adjust members 44 are loosely attached to the left and right bumper brackets 13 and 14 by bolts 48 and nuts 49. Hook 47 is brought into engagement with the upper inside leading edge of the bumper 12. Bracket adjust member 44 is firmly fixed with hook 47 in this position by tightening nut 49 on bolt 48. Turnbuckle 50 in an extended condition is assembled to base assembly 11 by inserting C-shaped hook 54 into hole 55. V-shaped hook 53 is placed in proximity with the lower inside edge of bumper 12 and turnbuckle 50 turned until V-shaped hook 53 is in firm engagement with the lower inside edge of bumper 12. As indicated earlier in this specification a short length of light chain bolted to the bumper brackets 13 and 14 may be used to provide an extension for the turnbuckle 50 in the event the bumper 12 has such depth as to leave insufficient adjustment when the turnbuckle is installed by itself. At this point while holding the bicycle rack in the unfolded carrying configuration with left and right support members 18 and 19 extending upwardly, locking pins 56 are inserted through the holes in the lower end of upright support members 18 and 19 to engage the threads in holes 59 and tightened in the threads. Bicycle hangers 32 are pivoted to a position substantially perpendicular to the base of the C channel forming top plate member 30. A bar 43 running substantially longitudinally in the framework of a bicycle is placed in the U-shaped depression 39 and upper retainer members 36 are pivoted to overlie the lower support members 35 thereby retaining the bicycle framework bar 43 in the bicycle hanger 32. A locking device (not shown) may be passed through loop 41 and around a section of lower support member 35 to secure the bicycle on the hanger 32.

To remove the bicycle from the hanger 32 any locking devices are removed, the upper retainers 36 are pivoted to a position substantially parallel to the base of top plate 30 and the bicycle is lifted out of the U-shaped depressions 39. The lower support members 35 are also pivoted to a position substantially parallel with the base of the top plate 30. To collapse the bicycle rack locking pins 56 are removed from the assembly and the left upright support member 18 is urged toward the center of the assembly in a clockwise direction pivoting about the left base pivot 20. As this occurs pivoting takes place about upper left pivot 26. The left end of top plate 30 is lowered toward the base member 17. Right upright support member 19 is then pivoted about right base pivot 23 in a counter clockwise direction causing upper right pivot point 29 to pass over the top of upper left pivot point 26 thus inverting top plate member 30. Right base pivot 23 being positioned slightly higher than left base pivot 20 allows right upright support member 19 to overlie left upright support member 18 in the folded configuration and substantially parallel to it. The countersunk bolt head at upper left pivot point 26 allows the rear of top plate to pass by the vertical arm of the angle comprising base member 17 to rest on the horizontal arm thereof. The foldable bicycle rack in the folded configuration is seen in FIG. 6.

The invention disclosed provides a foldable bicycle rack which may be attached to the bumper of a vehicle and need not be removed during periods of non use. The rack folds to assume a size which does not interfere with normal use of the vehicle. It may be installed in the front or on the rear and the preferred embodiment handily carries two bicycles. The bumper brackets and attachment hardward are formed to allow the bicycle rack to be fitted on any bumper of a conventional type on any model vehicle.

I claim:

1. A foldable bicycle rack for transporting a bicycle having a framework and having a framework bar extending longitudinally thereof said rack adapted to be mounted on a vehicle having a bumper comprising a base assembly, means for affixing said base assembly to said bumper, a top plate member, a bicycle hanger attached to said top plate member, left and right upright support members having a length longer than said top plate member, pivot members at each end of said left and right upright support members pivotally attaching each of said upright support members at opposite ends to both top plate member and the base assembly, and locking means for preventing pivoting of said support members when in an unfolded configuration for carrying a bicycle, whereby said top plate member is inverted when said locking means is released and said support members are moved to a folded stored configuration substantially parallel to said bumper while mounted on the vehicle without detachment at any pivot member and said top plate member is positioned substantially midway between said pivot members attaching said upright support members to said base assembly.

2. A foldable bicycle rack as in claim 1 wherein said base assembly comprises left and right bumper brackets having an upper surface and a lower extension, the brackets each having first and second holes for receiving said pivot members and said locking means respectively, and a base member attached to said left and right bumper brackets for spacing the brackets to afford rack stability when in the unfolded carrying configuration.

3. A foldable bicycle rack as in claim 2 wherein said means for affixing said base assembly to said bumper comprises left and right adjustable bracket members attached to the upper surfaces of said left and right bumper brackets and left and right turnbuckle members attached to the lower extensions of said left and right bumper brackets, said adjustable bracket and turnbuckle members operating to firmly engage the inside edges of the bumper.

4. A foldable bicycle rack as in claim 3 wherein the upper surfaces of said left and right bumper brackets have a hole and wherein said left and right adjustable bracket members comprise a flat rigid elongate rectangular piece having a short portion at one end bent through 180° forming a hook-like portion adapted to engage the upper inside edge of said bumper and having an elongate hole aligned with the long dimension, and a bolt passing through said elongate hole and said bracket hole, and a nut for engaging the end of said bolt operating to affix said flat elongate pieces in predetermined positions on said left and right bumper brackets.

5. A foldable bicycle rack as in claim 3 wherein the lower extensions of said left and right bumper brackets have an additional hole therethrough and wherein said left and right turnbuckle members comprise a V-shaped hook on the end of one threaded member for engaging the lower inside edge of said bumper, and a C-shaped hook on the end of the other threaded member for passing through said additional hole in the lower extension of said bumper bracket.

6. A foldable bicycle rack as in claim 1 wherein said bicycle hanger comprises at least two lower supports having at least one U-shaped depression each adapted to receive the bicycle framework bar and capable of pivotal motion between positions extending parallel to and perpendicular to said top plate member, and at least two upper bicycle retainer members of a length sufficient to overlie said U-shaped depressions when aligned with said lower supports and capable of the same degree of pivotal movement as said lower supports but movable independently of said lower supports.

7. A foldable bicycle rack as in claim 6 wherein said lower supports and said upper retainers have a soft non-abrasive plastic encapsulating coating adhering thereto for protecting the bicycle finish, a loop formed on the end of said retainer opposite the pivot end, and securing means for passing through said loop and around said lower supports for locking the bicycle framework bar in the U-shape depressions when the retainers overlie the U-shaped depressions.

8. A foldable bicycle rack as in claim 6 wherein said bicycle hanger has two lower supports having two U-shaped depressions each.

9. A foldable bicycle rack as in claim 1 wherein said locking means comprises a pin having a threaded end, said upright support members having a clearance hole therethrough at the base assembly end, said base assembly having threaded holes aligned with said clearance holes for receiving said pin when in the unfolded carrying configuration.

10. A foldable bicycle rack for transporting a bicycle having a framework and having a framework bar extending longitudinally thereof, said rack adapted to be mounted on a vehicle having a bumper comprising a base assembly, means for affixing said base assembly to said bumper, a top plate member, a bicycle hanger attached to said top plate member, left and right upright support members, pivot members at each end of said left and right upright support members pivotally attaching each of said upright support members at opposite ends to both top plate member and the base assembly, and locking means for preventing pivoting of said support members when in an unfolded configuration for carrying a bicycle, said top plate, base assembly and support member combination movable between an unfolded carrying configuration and a folded stored configuration while mounted on the vehicle wihtout detachment at any pivot member, said base assembly including left and right bumper brackets having an upper surface and a lower extension, the brackets each having first and second holes for receiving said pivot members and said locking means respectively, and a base member attached to said left and right bumper brackets for spacing the brackets to afford rack stability when in the unfolded carrying configuration, said left and right upright support members forming a trapezoid when in the unfolded carrying configuration with the top plate forming the short parallel side and the base member forming the long side, each upright support member having a hole extending through the end pivotally attached to said bumper brackets, said support member hole aligning with said second hole in the bumper bracket when in the unfolded carrying configuration for allowing insertion of said locking means.

11. A foldable bicycle rack for transporting a bicycle having a framework and having a framework bar extending longitudinally thereof, said rack adapted to be mounted on a vehicle having a bumper, comprising a base assembly, means for affixing said base assembly to the bumper, a top plate member formed of an open channel section having a length less than said base assembly, and having two sets of overlying spaced holes in the sides of said channel section, a bicycle hanger pivotally mounted in each set of said spaced holes for movement between a folded position adjacent the base of said channel and an unfolded position perpendicular thereto, a plurality of upright support members each of which is pivotally attached at its opposite ends to both the top plate member and the base assembly, and locking means for preventing pivoting of said support members, said top plate, base assembly and support member combination movable between an unfolded carrying configuration and a folded stored configuration.

12. A foldable bicycle rack for transporting bicycles for mounting on a vehicle having a bumper comprising a base assembly means for affixing said base assembly to said bumper, left and right upright support members, lower pivot means pivotally attaching the lower portions of said left and right upright support members to said base assembly, a top plate member, a bicycle hanger attached to said top plate member, upper pivot means pivotally attaching said top plate member to the upper portion of said left and right upright support members, and locking means for preventing said support members from pivoting about said upper and lower pivot means, thereby forming a rigid framework for supporting a bicycle whereby said top plate is inverted when said locking means are released, and said support means are pivoted about said upper and lower pivot means to fold downward to lie substantially alongside the bumper without detachment at any pivot means.

* * * * *